US006874195B2

(12) United States Patent
Kotlarski et al.

(10) Patent No.: US 6,874,195 B2
(45) Date of Patent: Apr. 5, 2005

(54) WIPER BLADE FOR WINDOWS OF MOTOR VEHICLES

(75) Inventors: Thomas Kotlarski, Ceske Budejovice (CS); Wilfried Merkel, Kappelrodeck (DE); Wolfgang Leutsch, Buehlertal (DE); Thomas Schmidt, Baden-Baden (DE)

(73) Assignee: Robert Bosch GmbH, Stuttgart (DE)

(*) Notice: Subject to any disclaimer, the term of this patent is extended or adjusted under 35 U.S.C. 154(b) by 18 days.

(21) Appl. No.: 09/860,854

(22) Filed: May 18, 2001

(65) Prior Publication Data

US 2002/0000018 A1 Jan. 3, 2002

Related U.S. Application Data

(63) Continuation-in-part of application No. 09/284,111, filed as application No. PCT/DE98/01895 on Jul. 9, 1998, now abandoned.

(30) Foreign Application Priority Data

Aug. 12, 1997 (DE) ........................................ 197 34 843

(51) Int. Cl.[7] ................................................... B60S 1/38

(52) U.S. Cl. .............................. 15/250.201; 15/250.48; 15/250.43

(58) Field of Search ....................... 15/250.201, 250.48, 15/250.451, 250.452, 250.43, 250.44, 250.361

(56) References Cited

U.S. PATENT DOCUMENTS

| | | | | | |
|---|---|---|---|---|---|
| 2,741,792 | A | * | 4/1956 | Ehrlich et al. | 15/250.452 |
| 3,088,155 | A | * | 5/1963 | Smithers | 15/250.201 |
| 3,317,945 | A | * | 5/1967 | Ludwig | 15/250.48 |
| 4,976,001 | A | * | 12/1990 | Wright | 15/250.48 |
| 6,279,191 | B1 | * | 8/2001 | Kotlarski et al. | 15/250.201 |
| 6,295,690 | B1 | * | 10/2001 | Merkel et al. | 15/250.201 |
| 6,499,181 | B1 | * | 12/2002 | Kotlarski | 15/250.201 |
| 6,516,491 | B2 | * | 2/2003 | Merkel et al. | 15/250.201 |

FOREIGN PATENT DOCUMENTS

| | | | |
|---|---|---|---|
| DE | 1247161 | * | 8/1967 |
| DE | 1505397 | * | 10/1969 |
| DE | 2839587 | * | 3/1980 |
| FR | 2199302 | * | 3/1974 |
| GB | 2106775 | * | 4/1983 |

* cited by examiner

*Primary Examiner*—Gary K. Graham
(74) *Attorney, Agent, or Firm*—Michael J. Striker

(57) ABSTRACT

A wiper blade for wiping windows of motor vehicles has an elongated rubber-elastic wiper strip placeable on a window to be wiped and arranged substantially longitudinally axially parallel on a surface of a strip-shaped, spring-elastic support element which is connected with a wiper arm which is spring loaded toward the window and driven transversely to a longitudinal extension of the wiper blade, and a leading-edge face extending longitudinally of the wiper blade and substantially parallel to the window and facing into a wind so as to form an acute angle with the window.

8 Claims, 2 Drawing Sheets

18
III
III
24
20
28
16
26
22
10
14
12
36

54
16
22
12
10
36
56

WIPER BLADE FOR WINDOWS OF MOTOR VEHICLES

CROSS REFERENCE TO A RELATED APPLICATION

This application is a continuation-in-part of patent application Ser. No. 09/284,111 filed on Jun. 1, 1999 now abandoned, which was the national stage of international application No. PCT/DE98/01895, filed Jul. 9, 1998.

BACKGROUND OF THE INVENTION

The present invention relates to wiper blades for windows of motor vehicles.

In wiper blades the support element is meant to assure the evenest possible distribution of the wiper blade contact pressure on the windows, over the entire swept field swept by the wiper blade. By means of a suitable curvature of the unstressed support element—that is, when the wiper blade is not applied to the wiper blade—the ends of the wiper strip, which in wiper blade operation is pressed entirely against the window, are urged toward the window by the then-stressed support element, even if the radii of curvature of spherically curved vehicle windows differ in every position of the wiper blade. The curvature of the wiper blade must accordingly be somewhat greater than the greatest curvature measured in the swept field of the window to be wiped. The support element thus replaces the complicated support bracket construction, having two spring rails disposed in the wiper strip, of the kind employed in conventional wiper blades (German Published, Unexamined Patent Application DE-OS 15 05 397).

In a known wiper blade of this type (German Patent DE-PS 12 47 161), the wiper blade, or its support element, which for reasons of distributing the contact pressure protrudes far past the wiper strip in the middle region of the wiper blade, can on the one hand be engaged from below, on the front side facing into the wind, with an attendant buildup of overpressure, by this overpressure. On the other hand, on the back side facing away from the wind, because of the structural form noted above, a considerable negative pressure builds up. Although the wiper blade, which during operation usually executes a pendulum motion, constantly changes its position relative to the oncoming relative wind, even then one of its long sides is always more or less greatly exposed to the wind and is therefore called the front side, while its other long side is accordingly also thought of as the back side. At relatively high vehicle speeds, given the cooperation of these two aforementioned pressures, both of which are oriented counter to the wiper blade contact pressure, this contact pressure is reduced at least enough that proper wiping is no longer possible. Increasing the wiper blade contact pressure against the window at high vehicle speeds could admittedly reduce the severity of this problem, but at lower vehicle speeds, when the liftoff tendency is less, the friction between the wiper blade and the window increases; this leads to undesirable noise buildup and to excessively high stress on the drive components and on the rubber of the wiper.

SUMMARY OF THE INVENTION

It is therefore an object of the present invention to provide a wiper blade for windows of motor vehicles, which avoids the disadvantages of the prior art.

In keeping with these objects and with others which will become apparent hereinafter, one feature of the present invention resides, briefly stated, in a wiper blade which has an elongated, strip-shaped spring-elastic, curved support element having a longitudinal extension which follows a curvature, a convex upper side which follows the curvature and defines a plane, and a concave lower side; an elongated, rubber-elastic wiper strip which is located substantially longitudinally axially parallel directly on said concave lower side of said support element, a connection device provided for said wiper arm and directly arranged on said convex upper side of said support element; and a leading-edge face formed on a projection which is arranged on said convex upper surface of said support element and enclosing an acute angle with a plane defined by valves of said support element.

In the wiper blade, via the leading-edge face that faces into the wind, a force component aimed at the window is built up, which counteracts the liftoff tendency of the two pressures and thus assures excellent cleaning quality, at least in the region of the swept field swept by the wiper blade, that is, the region that is important to the vehicle's driver. Depending on the size of the leading-edge face and/or on the size of the approach angle $\alpha$, this auxiliary contact pressure can be adapted to the variable demands that depend on the type of the vehicle. It is also advantageous in the arrangement of the invention that as a function of the vehicle speed, the contact pressure rises or falls with this speed. Thus a suitably great "auxiliary contact pressure" is opposed only to the liftout tendency that occurs at high speed.

Although it is known from DEOS 15 05 397 for a wiper strip side edge, facing toward the air stream and inclined relative to the window, to be disposed on a wiper blade, still the wiper blade described there is equipped with the support bracket system already described. Together with spring rails disposed in the wiper strip, this support bracket system forms the support element of the wiper blade, on which the wiper strip is retained.

An especially simple, economical realization of the leading-edge face is obtained if the leading-edge face is disposed on the wiper strip.

A further simplification, especially with regard to producing the wiper strip, is obtained if the wiper strip, with a projection, crosses the support element in a plane that is vertical to a plane defined by a convex upper side of the support element, and if also the leading-edge face is embodied on the elongated projection that is longitudinally axially parallel to the support element.

This can advantageously be attained for instance in that the projection is formed onto a sweeper strip of the wiper strip, and/or that the projection is extruded onto the sweeper strip of the wiper strip.

The flexibility of the wiper strip with regard to a plane vertical to a plane defined by a convex upper side is not impaired, or is impaired only insignificantly, if the projection comprises a material different from, and in particular softer than, the sweeper strip. Under some circumstances it may be expedient to select a harder material for the projection, to increase the stability of the wiper blade.

In especially problematic window designs, a leading-edge face that, seen in cross section, is provided with a hollow curvature can be expedient.

Advantages in terms of assembly and installation are obtained if the support element is embodied in multiple parts.

A simple version, in terms of production, of a multi-part support is attained in that the support element is hairpin-shaped, and its two pin-like legs that are parallel to one another are joined integrally together by a crossbar.

To secure the hairpin-shaped support element to the wiper strip, the other ends of the pinlike legs, remote from the crossbar, are joined together by a retaining element.

Further advantageous refinements of and features of the invention are recited in the ensuing description of two exemplary embodiments shown in the accompanying drawing.

DESCRIPTION OF THE PREFERRED EMBODIMENT

Figure 1:
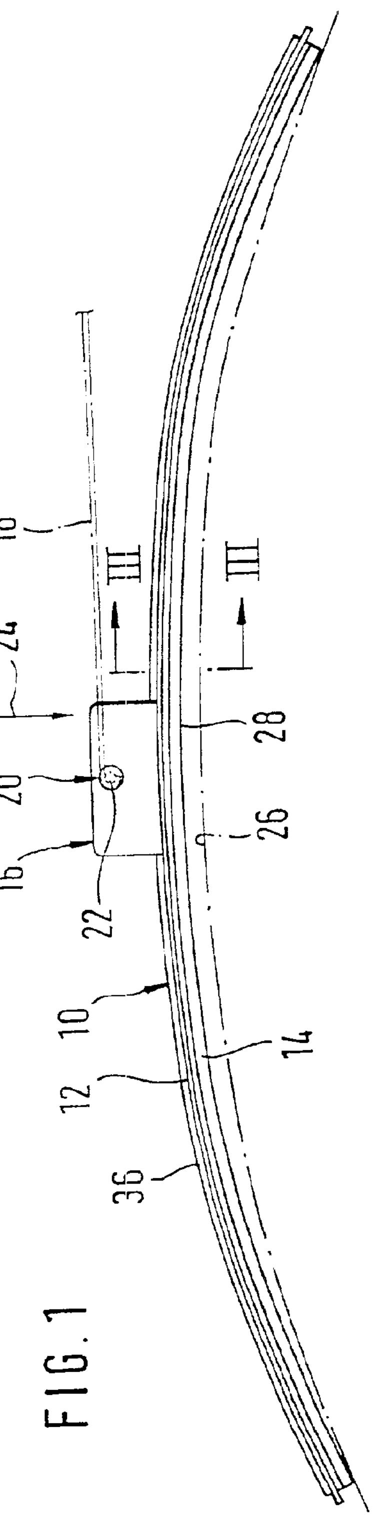
FIG. 1 shows a side view of a wiper blade of the invention.
Figure 2:
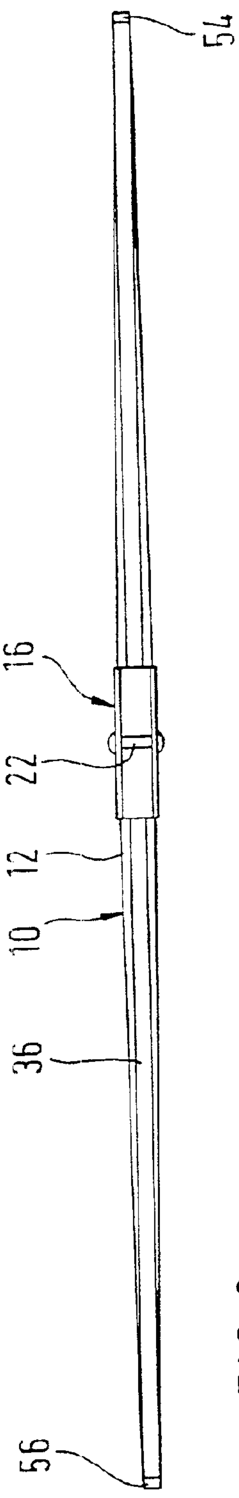
FIG. 2 shows a plan view on the wiper blade of FIG. 1.

A wiper blade 10 shown in FIGS. 1 and 2 has a multi-part, elongated, spring-elastic support element 12, to which an elongated, rubber-elastic wiper strip 14 is secured longitudinally axially parallel to it. The support element 12 in unloaded condition is curved upper surface 13 which follows its curvature from behind a plane which, when the wiper blade 10 is placed on the window to be wiped, extends parallel to a window surface 26. Furthermore, the support element 12 has a concave lower side 15. The support element 12 also has two legs 17 which have upper sides defining the plane provided by the support element.

A connection device 16 is disposed on the top side of the support element, and with its aid the wiper blade 10 can be detachably connected to a driven wiper arm 18. A hook acting as a counterpart connection means is formed onto the free end 20 of the wiper arm 18 and grasps a pivot pin 22 that belongs to the connection device 22 of the wiper blade. The securing between the wiper arm 18 and the wiper bade 10 is taken on by securing means not shown in further detail but known per se and embodied as adapters. The wiper arm 18 and thus also the hook on the end 20 of the arm is urged in the direction of the arrow 24 toward the window to be wiped, whose surface to be wiped is suggested in FIG. 1 by a dot-dash line 26. Since the dot-dash line 26 is mean to represent the greatest curvature of the window surface, it is quite apparent that the curvature of the wiper blade 10, which rests with its two ends on the window, is greater than the maximum curvature of the window. Under the contact pressure (arrow 24), the wiper blade presses with its wiper lip 28 over its entire length against the window surface 26. This causes a tension to build up in the striplike, spring-elastic support element 20, and this tension assures a proper contact of the wiper strip 14 or wiper lip 28, over their entire length, with the motor vehicle window.

The particular design of the wiper blade and especially of the wiper strip 14 will now be described in further detail. In the embodiment of the invention shown in FIG. 3, the wiper strip 14 comprises a base body 30, onto which the wiper lip 28, which rests on the window surface 26, is formed via a so-called tilting rib 32. Together with the tilting rib 32 and the wiper lip 28, the base body 30 forms a so-called sweeper strip 34, which has a constant cross section over its entire length. On the side of the base body 30 remote from the wiper lip 28, a projection 36 that comprises a softer material than the sweeper strip 34 is joined to the base body 30. The connection is made via a relatively narrow connecting rib 38 that remains between two opposed longitudinal grooves 40 and 42 that are open at their periphery.

Figures 3, 4, 5:
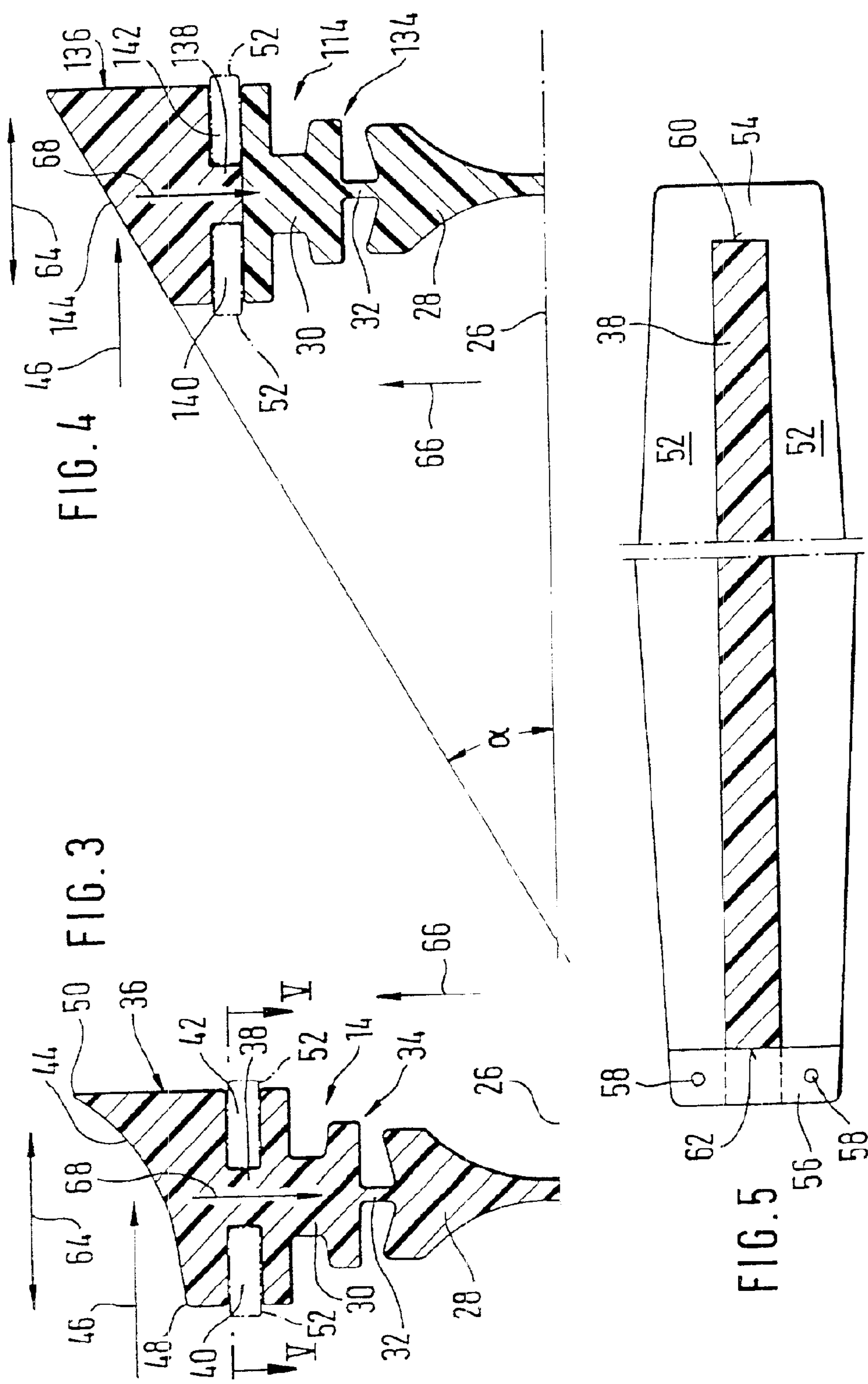
FIG. 3 shows a cross section through a first version of a wiper strip, belonging to the wiper blade, taken along the line III—III in FIG. 1 and shown on a larger scale.
FIG. 4 shows a cross section as in FIG. 3 but through a different version of the wiper strips.
FIG. 5 shows a plan view on a support bracket, belonging to the wiper blade, on a larger scale and shortened.

Above the two longitudinal grooves 40 and 42, or in other words where the projection again extends across the width of the base body 30, a leading-edge face 44 is embodied on the side facing away from the window surface 26; as seen in cross section here, this leading-edge face has a hollow curvature facing into the win (arrow 46). The edge 48 of the projection 36 or of the leading-edge face 44 located toward the front, in the direction of the wind (arrow 46), is located closer to the window surface 26 to be wiped than the edge 50 located to the rear with respect to the wind. As a result, a line connecting the two edges 48 and 50 forms an acute angle, marked $\alpha$ in FIG. 4, of approximately 35° with the window surface 26 and thereby also with the upper side 13 of the support element 12 or its legs 17. In the embodiment of FIG. 3, the various regions 28, 32, 30, 38 and 36 are made integrally, preferably being extruded. The leading-edge face 44 has an airflow approach angle of approximately 10° in the front region and approximately 70° in the rear region.

In the embodiment of FIG. 4, the basic construction of the wiper strip 1114, in terms of shape, is identical to the construction of the wiper strip 14 in FIG. 3. The same reference numerals as in FIG. 3 are therefore used in FIG. 4 for the wiper lip 28, base body 30 and tilting rib 32. In a departure from the wiper strip 14 of FIG. 3, the projection 136 of the wiper strip 114 comprises a different material from the sweeper strip 134. In the wiper strip 114 of FIG. 4, the projection 136 extends with a connecting rib 138 toward the base body 30, which it is solidly connected to the top side of the base body 30 facing away from the window surface 26. This can be achieved by so-called multiple-substance extrusion, in which the two portions 136 and 134 of the wiper strip 114 here are extruded separately and then placed against one another immediately after the extrusion, so that an intimate bond between the projection, or its connecting rib 38, and the base body 30 is achieved. In this case again, the height of the connecting rib 38 creates two opposed longitudinal grooves 140 and 142, because the width of the connecting rib 138 is considerably less than the width of the projection 136. FIG. 4 also clearly shows that the projection 136, on its front side facing away from the window surface 26, has a leading-edge face 144 beveled in gabled fashion, which seen crosswise to its length forms an acute angle $\alpha$ with the window. This leading-edge face 144 faces into the wind (arrow 46).

The connection between the wiper strip 14 or 114 and the support element 12 will be described below in conjunction with FIG. 5. The support element 12 in this exemplary embodiment is in two parts. Its ain part takes the shape of a hairpin. It thus has two pinlike legs 52, parallel to and spaced apart from one another, one each of whose ends adjacent one another are joined integrally with one another by a crosspiece 54. This hairpin-shaped main part 52, 54 forms the actual support element 12. To stabilize the free ends of the legs 52, these ends are connected to one another in bridge-like fashion via a separate retaining element 56. This assures good stability of the support element 12. The connection between the ends of the legs 52 and the retaining element 56 is made in some regions 58, for instance by spot welding, since in the exemplary embodiment the support element 12 is made with its individual portions 52, 53, 56 from a spring band steel. However, it is also conceivable for the entire support element, or its individual parts, to be made of an elastic plastic. The spacing between the two legs 52 is equivalent to the width of the connecting rib 38 of the wiper strips 14 or 114. For assembly, with the retaining element 56 not yet in place, the hairpin-shaped support element 12 is thrust with its two legs 52 longitudinally into the longitudinal grooves 40, 42 of the wiper strip 14. This assembly position is indicated by dot-dash lines in FIGS. 3 and 4. The insertion operation is complete when the rib 54 comes to rest against the face end 60 of the connecting rib 38. In this position, the free ends of the legs 52 still protrude outward past the other face end 62 of the connecting rib 38 and thus present mounting faces for the retaining element 56 and provides space for the securing regions 58.

As FIGS. 2–4 shown, the support element 12 in somewhat wider, in its middle region, than the wiper stip 14 with its projection 36 or 136 and thus hardly affords any space for securing the connection device 16.

It is a feature common to both exemplary embodiments that the wiper blade 10 is provided with a leading-edge face 44 or 144, which extends in the longitudinal direction of the wiper blade and substantially parallel to the window and faces into the wind (arrow 46), and which seen crosswise to it length forms an acute angle $\alpha$, which is between 10° and 70°, with the window.

To explain the mode of operation of the wiper blade of the invention, see FIG. 3. During operation of the wiper blade, whose operating motion is represented by double arrow 64 when the wiper blade is displaced with its wiper strip 14 over the surface 26 of the window, the support element 12 is located in a plane that extends substantially parallel to the surface 26 of the window. The wiper blade 10 then experiences a contact pressure (arrow 24 in FIG. 1) that is countered during wiper blade operation, especially at high vehicle speeds, by a liftoff tendency acting in the direction of the arrow 66. Since the leading-edge face 44 or 144 of the wiper trip 14 or 114 is facing into the wind, 46 and forms an acute angle $\alpha$ with the window to be wiped, the pressure of the relative wind 46 generates a force component that is represented in FIGS. 3 and 4 by an arrow 68. This force component 68 acts counter to the liftoff tendency (arrow 66) and thus keeps the contact pressure (arrow 24) within the legally prescribed range.

It will be understood that each of the elements described above, or two or more together, may also find a useful application in other types of constructions differing from the types described above.

While the invention has been illustrated and described as embodied in wiper blade for windows of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. A wiper blade for windows of motor vehicles, comprising an elongated, strip-shaped, spring-elastic, curved support element having two legs which have a longitudinal extension following a curvature, convex upper sides defining a plane which follows the curvature, and concave lower sides; an elongated, rubber-elastic wiper strip located substantially longitudinally axially parallel directly on said concave lower sides of said legs; a connection device provided for connection of the wiper blade with a wiper arm and arranged directly on said convex upper side of said legs; and a leading-edge face formed on a projection being of unitary construction with the wiper strip, which is arranged on said convex upper sides of said legs and which encloses en acute angle with a plane defined by said convex upper aides of said legs of said support element so as to generate a force component which counters a liftoff tendency of the wiper blade and keeps a contact pressure of the wiper blade on a vehicle window, wherein the wiper strip has a base body, wherein a wiper lip is formed on the base body by means of a tilting rib and wherein two, opposed side longitudinal grooves that are open at their periphery are provided in the base body, wherein the legs of the support element are introduced into the longitudinal grooves and wherein a narrow connecting rib remains between the two opposed longitudinal grooves, wherein said projection is composed of a material which is different and softer than that of said sweeper strip.

2. A wiper blade as defined in claim 1, wherein said wiper blade with said projection cross said support element in a plane located on said plane which is defined by said convex upper surface.

3. A wiper blade as defined in claim 1, wherein said projection is extruded onto a sweeper strip of said wiper strip.

4. A wiper blade as defined in claim 1, wherein said leading-edge face, seen in cross section, has a hollow curvature facing into a wind.

5. A wiper blade as defined in claim 1, wherein said support element is composed of a plurality of parts.

6. A wiper blade as defined in claim 1, wherein said support element is hairpin-shaped and has two pin-shaped legs which are parallel to one another and joined integrally together by a cross bar.

7. A wiper blade as defined in claim 6, wherein said pin-shaped legs have other ends which are remote from said cross bar and joined together by a retaining element.

8. A wiper blade as defined in claim 1, wherein said leading-edge face is curved.

* * * * *